(12) United States Patent
Hasegawa et al.

(10) Patent No.: US 8,020,178 B2
(45) Date of Patent: Sep. 13, 2011

(54) OPTICAL DISK DEVICE HAVING SUPPORTED ROTATING ARM

(75) Inventors: Kazunori Hasegawa, Kanagawa (JP); Tsukasa Nakayama, Kanagawa (JP); Hiroto Nishida, Ishikawa (JP); Isamu Nakade, Ishikawa (JP)

(73) Assignee: Panasonic Corporation, Osaka (JP)

( * ) Notice: Subject to any disclaimer, the term of this patent is extended or adjusted under 35 U.S.C. 154(b) by 1106 days.

(21) Appl. No.: 11/571,954

(22) PCT Filed: Jul. 12, 2005

(86) PCT No.: PCT/JP2005/012859
§ 371 (c)(1), (2), (4) Date: Jan. 11, 2007

(87) PCT Pub. No.: WO2006/009018
PCT Pub. Date: Jan. 26, 2006

(65) Prior Publication Data
US 2007/0230318 A1    Oct. 4, 2007

(30) Foreign Application Priority Data
Jul. 15, 2004 (JP) ................................ 2004-208183

(51) Int. Cl.
*G11B 17/028* (2006.01)
(52) U.S. Cl. .................... 720/662; 720/690
(58) Field of Classification Search .................. 720/662, 720/689, 690
See application file for complete search history.

(56) References Cited

U.S. PATENT DOCUMENTS

| 5,138,591 | A | * | 8/1992 | Ogawa et al. ............ 369/30.83 |
| 5,481,512 | A |   | 1/1996 | Morioka et al. |
| 5,631,894 | A | * | 5/1997 | Takahashi ................ 720/667 |
| 5,682,364 | A | * | 10/1997 | Ogawa ................ 369/30.81 |
| 5,917,787 | A | * | 6/1999 | Tsuchiya et al. ........ 369/30.81 |
| 6,990,675 | B2 | * | 1/2006 | Suzuki et al. ............. 720/672 |
| 7,093,269 | B2 | * | 8/2006 | Murotani ................ 720/605 |

(Continued)

FOREIGN PATENT DOCUMENTS
EP    05 76 0185    5/2009

(Continued)

OTHER PUBLICATIONS

International Search Report for Application PCT/JP2005/012859, dated Aug. 16, 2005.

*Primary Examiner* — Brian E Miller
(74) *Attorney, Agent, or Firm* — RatnerPrestia

(57) ABSTRACT

An optical disk device has superior vibration characteristics by preventing vibration of a rotating arm. A desired optical disk is selected from the plurality of optical disks which are stacked and accommodated. The rotating arm is rotated to a working space provided for the desired optical disk. A turntable is positioned, and an optical head is moved to perform the recording/reproduction. Because the tip part of the rotating arm of a cantilever structure is supported by a support member extending along the axial line CL of the optical disk, it has a structure supported by both ends. Thus, the vibration of the rotating arm can be prevented. Because the support member extends along the axial line CL of the optical disk, it passes through a holding hole at the center of the optical disk and a notch provided at the center of a tray, without interference on its way, thereby supporting the rotating arm.

1 Claim, 9 Drawing Sheets

U.S. PATENT DOCUMENTS

| | | |
|---|---|---|
| 7,339,858 B2 * | 3/2008 | Tatekawa .................... 369/30.85 |
| 7,418,723 B2 * | 8/2008 | Nishida et al. ................. 720/662 |
| 7,418,724 B2 * | 8/2008 | Tatekawa et al. .............. 720/673 |
| 2001/0012260 A1 * | 8/2001 | Tamiya et al. ................. 369/192 |
| 2001/0043554 A1 | 11/2001 | Takai |
| 2004/0111731 A1 * | 6/2004 | Suzuki et al. ................. 720/624 |
| 2006/0053431 A1 * | 3/2006 | Nakade et al. ................ 720/662 |

FOREIGN PATENT DOCUMENTS

| | | |
|---|---|---|
| JP | 08-186566 | 7/1996 |
| JP | 10-021628 A | 1/1998 |
| JP | 11-045490 | 2/1999 |
| JP | 11-306637 | 11/1999 |
| JP | 2000-004845 | 1/2000 |
| WO | WO 00/79530 A1 | 12/2000 |

* cited by examiner

OPTICAL DISK DEVICE HAVING SUPPORTED ROTATING ARM

This application is a U.S. national phase application of PCT international application PCT/JP2005/12859.

TECHNICAL FIELD

The present invention relates to an optical disk device that performs at least one of the information recording/reproduction onto/from an optical disk and reproduction of information recorded on an optical disk.

BACKGROUND ART

There have been developed multi-disk optical disk devices that accommodate a plurality of optical disks in the main unit and record or reproduce information onto/from a selected optical disk as a type of optical disk device that performs at least one of the information recording/reproduction onto/from an optical disk and reproduction of information recorded on an optical disk (for example, refer to Patent Reference 1).

In general, in a multi-disk optical disk device that records or reproduces information onto/from a desired optical disk selected from the plurality of disks accommodated in a plurality of trays, when a desired optical disk is selected, work space for recording/reproducing information onto/from the optical disk is formed. A rotating arm equipped with a turntable and an optical pickup is inserted into the work space while being rotated in order to insert a turntable for rotating an optical disk and an optical pickup for performing recording/reproduction.

Patent Reference 1: JP-A-11-45490 (FIG. 7)

DISCLOSURE OF THE INVENTION

Problems that the Invention is to Solve

As described above, the rotating arm has a cantilever structure whose tip includes a turntable is a free end.

Thus, when external vibration acts on the rotating arm, the tip of the rotating arm is likely to vibrate. In a related art optical dusk device, a turntable and an optical pickup vibrate due to external vibration, which leads to poor vibration characteristic such as sound dropouts.

The invention has been accomplished in order to solve the related art problems. An object of the invention is to provide an optical disk device with superior vibration characteristic that prevents vibration of an rotating arm.

Means for Solving the Problems

The invention provides an optical disk device comprising a rotating arm that includes a turntable which rotates an optical disk at a tip of the rotating arm and that movably supports an optical head part which records/reproduces information onto/from the optical disk and that is rotatable between a standby position and a playing position about a pivot substantially perpendicular to a disk surface of the optical disk; and a support member that supports the rotating arm on a main body, wherein when the rotating arm is located in the playing position, the rotating arm is supported by the main body in a different position from the pivot.

With this configuration, the rotating arm of a cantilever structure is supported by the main body in a different position from the pivot. This configuration prevents possible vibration of the rotating arm thus improving the vibration characteristic.

The optical disk device according to the invention has a configuration where the support member is extendable in a direction substantially parallel to the pivot.

With this configuration, more space is provided by contracting the support member, which provides a more compact or lower-profile device design.

The optical disk device according to the invention has a configuration where the support member supports the tip of the arm in the playing position on the main body.

With this configuration, the pivot and the tip of the rotating arm support the rotating arm thus improving the vibration resistance in the vicinity of the turntable.

The optical disk device according to the invention has a configuration where the support member extends from the main body to the rotating arm and has a contact surface which comes into contact with the rotating arm.

With this configuration, the rotating arm and the support member are in surface contact with each other. This enhances the stability of the rotating arm thus improving the vibration resistance of the rotating arm.

The invention provides the optical disk device according to any one of claims 2 to 4, further includes a retaining member which retains the support member to the rotating arm.

With this configuration, it is possible to reliably fix the support member to the rotating arm, thus improving the vibration resistance in vertical direction.

ADVANTAGE OF THE INVENTION

The invention provides an optical disk device that includes a support member for supporting a rotating arm on a main body thus supporting the tip of the cantilever-structure rotating arm to provide a structure supported by both ends, thereby the vibration resistance of the rotating arm is improved.

Figure 1:
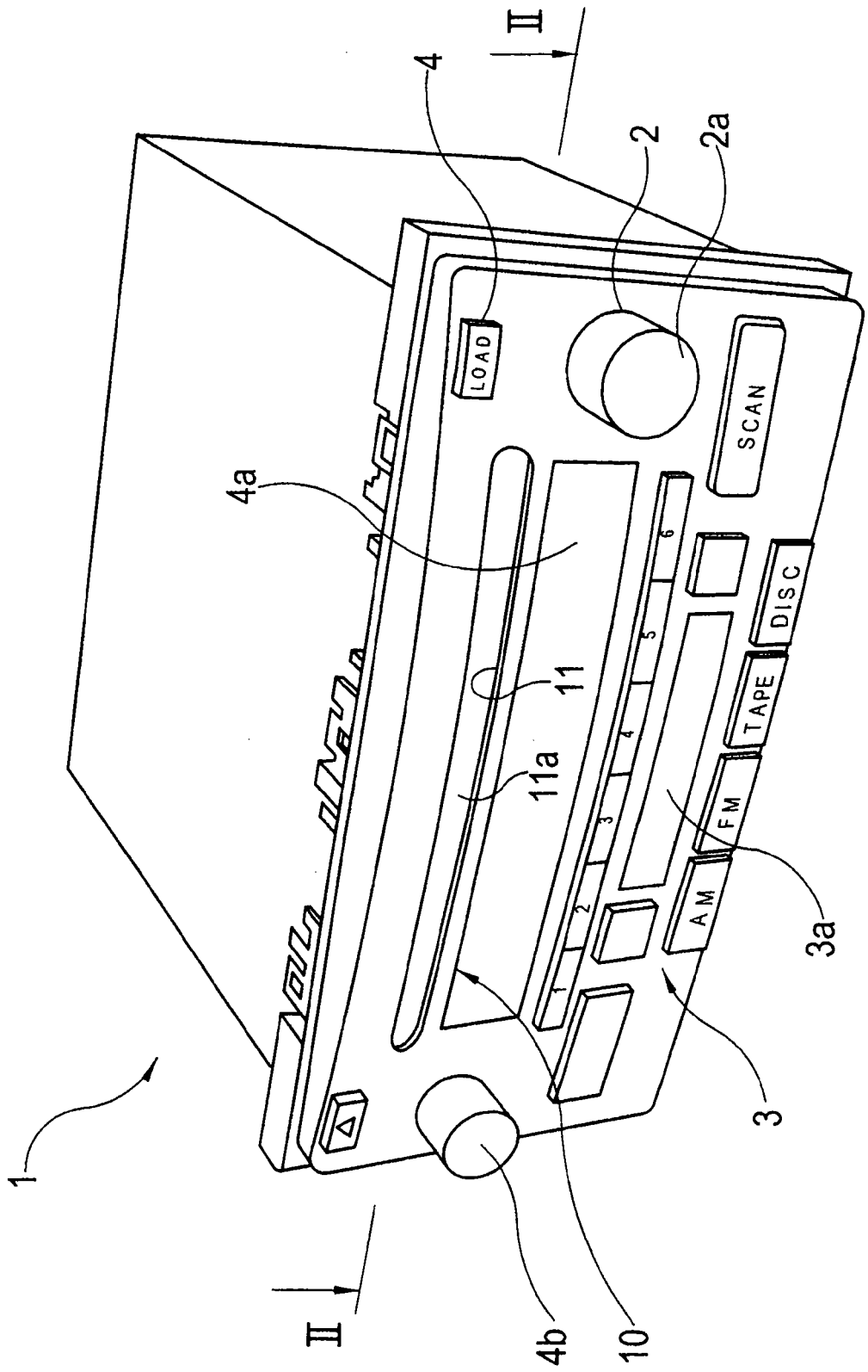
FIG. 1 is a general schematic view of a car audio device incorporating an optical disk device according to an embodiment of the invention.

10 optical disk device
12 optical disk
13 main body
20 tray
30 support member
31 turntable
32 pivot
34 optical head part
40 support member
42a contact surface
CL axis line

BEST MODE FOR CARRYING OUT THE INVENTION

An optical disk device according to the embodiments of the invention will be described with reference to drawings.

FIG. 1 is a general schematic view of a car audio device 1 incorporating an optical disk device 10 according to an embodiment of the invention. The car audio device 1 incorporates a radio 2, a cassette tape player 3 or the like in addition to the optical disk device 10. A display part 4a and a power/volume control 4b used for all functions, as well as an optical disk loading port 11, a radio tuning control 2a, and a cassette tape loading port 3a are provided on the front panel 4. A controller 5 for controlling the radio 2, the cassette tape player 3, the optical disk device 10 or the like are provided inside the car audio device 1.

Figure 2:
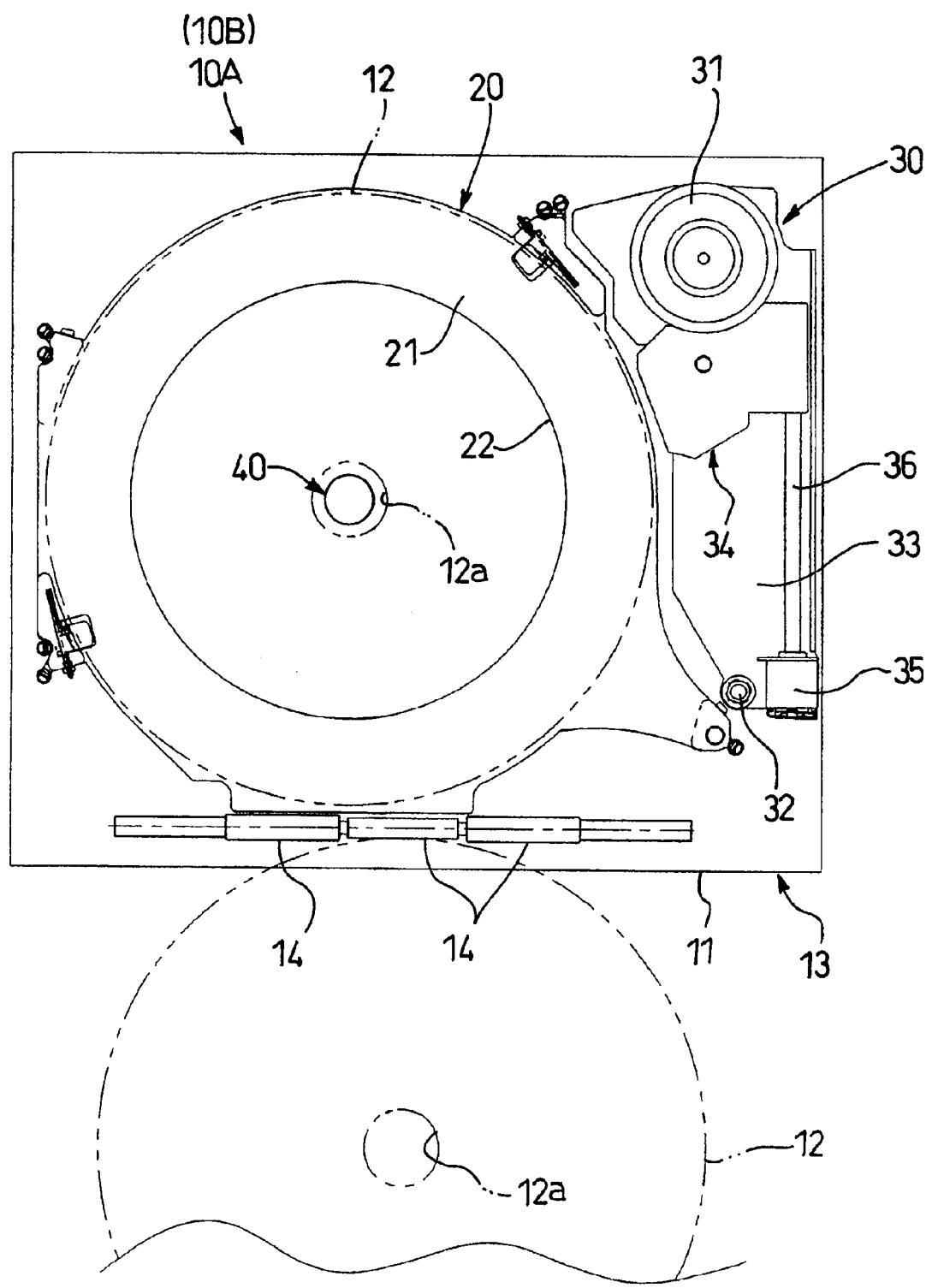
FIG. 2 is a plan view of an optical disk device according to an embodiment of the invention viewed from the II-II position in FIG. 1.

FIG. 2 is a plan view of an optical disk device 10A according to an embodiment of the invention viewed from the II-II position in FIG. 1.

As shown in FIG. 2, the optical disk device 10A according to an embodiment of the invention includes a main body 13 that can accommodate a plurality of optical disks therein, a plurality of stacked trays for individually holding the optical disks 12 inside the main body 13, and a rotating arm 30 that includes a turntable rotating while holding an optical disk 12 at the tip, movably supports an optical head 32 for recording/reproducing information onto/from the optical disk 12, and is rotatable about a pivot 32 parallel to the stacking direction of the trays 20. The optical disk device 10A further includes a support member 40 that extends along the axis line CL of an optical disk 12 to support the tip of the rotating arm 20 on the main body 13. The axis line CL of an optical disk 12 is a virtual axis line that passes through the approximate center of the optical disk 12 placed on the tray 20 and extends in a direction parallel to the stacking direction of the trays 20.

As shown in FIG. 2, in the vicinity of the tray 20 inside the main body (in the right-hand area of FIG. 2), the rotating arm 30 that includes a turntable rotating while holding an optical disk 12 is provided rotatably about the pivot 32 at the tip. On a suspension chassis 33 of the rotating arm 30, an optical head part 34 is provided in a reciprocating fashion along the direction from the pivot 32 and the center of the turntable 31. The optical head part 34 engages with a lead screw rotated by a drive motor 35 and thus moves with the rotation of the lead screw 36.

Inside the main body 13 of the loading port 11, a pair of upper/lower transfer rollers 14 is provided so as to be used to bring in an optical disk inserted into the loading port 11 or eject from the loading port 11 an optical disk where recording or reproduction is complete.

The tray 20 includes a circular holding part 21 for holding an optical disk 12 and a circular notch 22 inside the holding part 21. Thus, a holding hole 21a provided at the center of the optical disk 12 accommodated in the tray 20 can be penetrated vertically.

Figure 3:
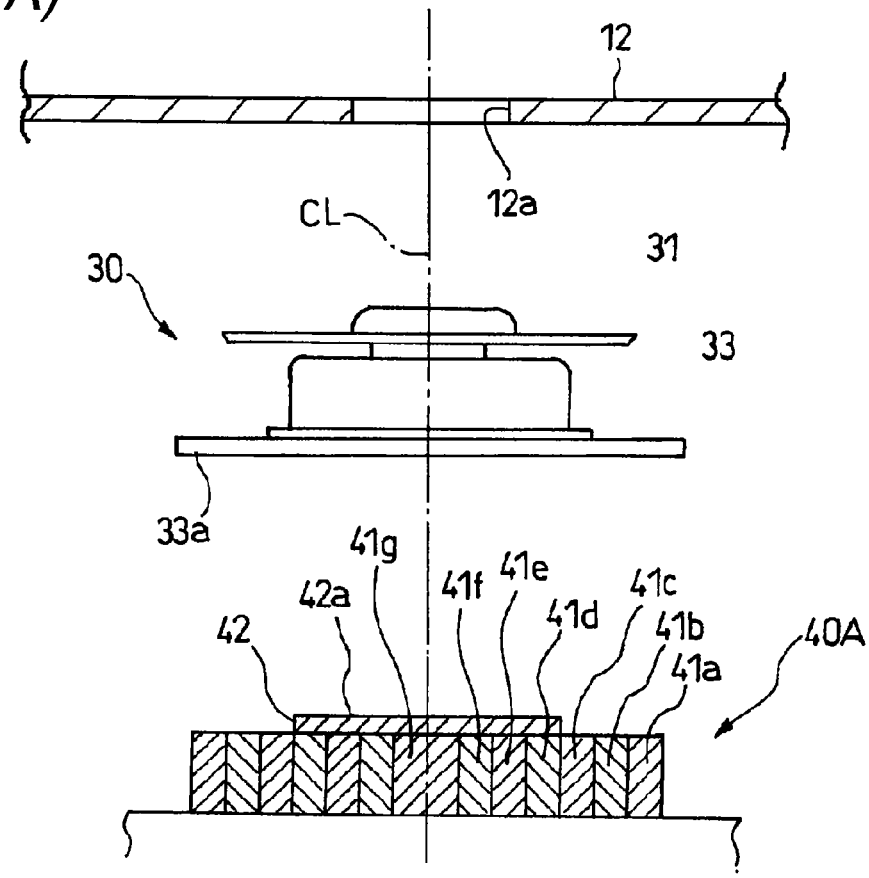
FIG. 3(A) is a cross-sectional view of the standby state of a support member according to the first embodiment of the invention.
FIG. 3(B) is a cross-sectional view of the support state of a support member according to the first embodiment of the invention.
Figure 3:
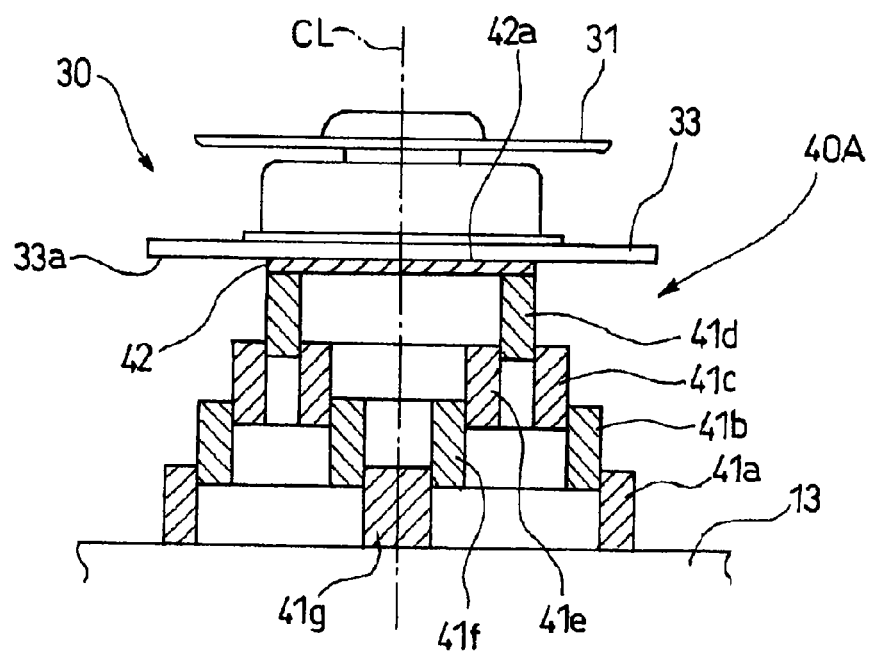

FIGS. 3(A) and 3(B) show the first embodiment of a support member 40. A support member 40A is provided on the main body 13 beneath the turntable 31 of the rotating arm 30 positioned in a recording/reproduction position. The support member 40A is composed of a plurality of (seven in this example) cylindrical ring-shaped parts 41a, 41b, ..., 41g overlaid one on the other. The height of each ring-shaped part is almost constant and at the central part thereof is provided a support plate 41 including a contact surface 42 that comes into contact with the bottom surface of the suspension chassis 33 of the rotating arm 30 when the same is extended.

The support member 40 is extendable along the axis line CL of the optical disk. Thus, the support member 40 passes through the holding hole 12a at the center of the optical disk 12 and a notch provided at the center of the tray 20 without interfering on its way, thereby supporting the rotating arm 30.

The support plate 42 is designed to have a smaller diameter than that of the holding hole 12a of the optical disk 12 so as to readily penetrate the holding hole 12a.

As shown in FIG. 3(A), in the standby state before extension, the support member 40A forms a flat plate of a small height to avoid interference with the tray 20 or the rotating arm 30.

When the ring-shaped part 41a in the outermost position is rotated by a drive unit (not shown), as shown in FIG. 3(B), the support member 40A gradually extends upward toward the inner side and the ring-shaped part 41d in the central position extends upward along the axis line CL of the optical disk 12.

In case the rotating arm 30 moves in vertical direction, the rotation quantity of the ring-shaped part 41a is controlled to make height adjustment with ease. In this support state, the contact surface 42a of the support plate 42 provided on the uppermost ring-shaped part 41d comes into contact with the bottom surface 33a of the suspension chassis 33 of the rotating arm 30 to support the rotating arm 30.

In the optical disk device 10A according to the first embodiment of the invention, the ring-shaped part 41 extends along the axis line CL of the optical disk 12 to support the bottom surface of the tip of the suspension chassis 33 of the rotating arm 30 and thus supports the tip of the cantilever structure rotating arm 30, thereby providing the structure of the rotating arm 30 supported by both ends.

This prevents vibration of the rotating arm 30 thus improving the vibration characteristic, which properly rotates the turntable 31 and moves the optical head part 34 thus successfully performing recording and reproduction of information.

While the support member 40a simply supports the suspension chassis 33 of the rotating arm 30 in the first embodiment, a configuration is possible where a fixing unit is provided for making the support plate 42 rotatable by rotating the ring-shaped part 41g and fixing the support surface 41a and the bottom surface of the suspension chassis 33. In this case, it is possible to suppress the upward movement of the rotating arm 30.

Next, an optical disk device 10B according to the second embodiment of the invention will be described with reference to drawings.

The parts in common with those of the optical disk device 10A according to the first embodiment are given the same signs and duplicated description is omitted.

Figure 5:
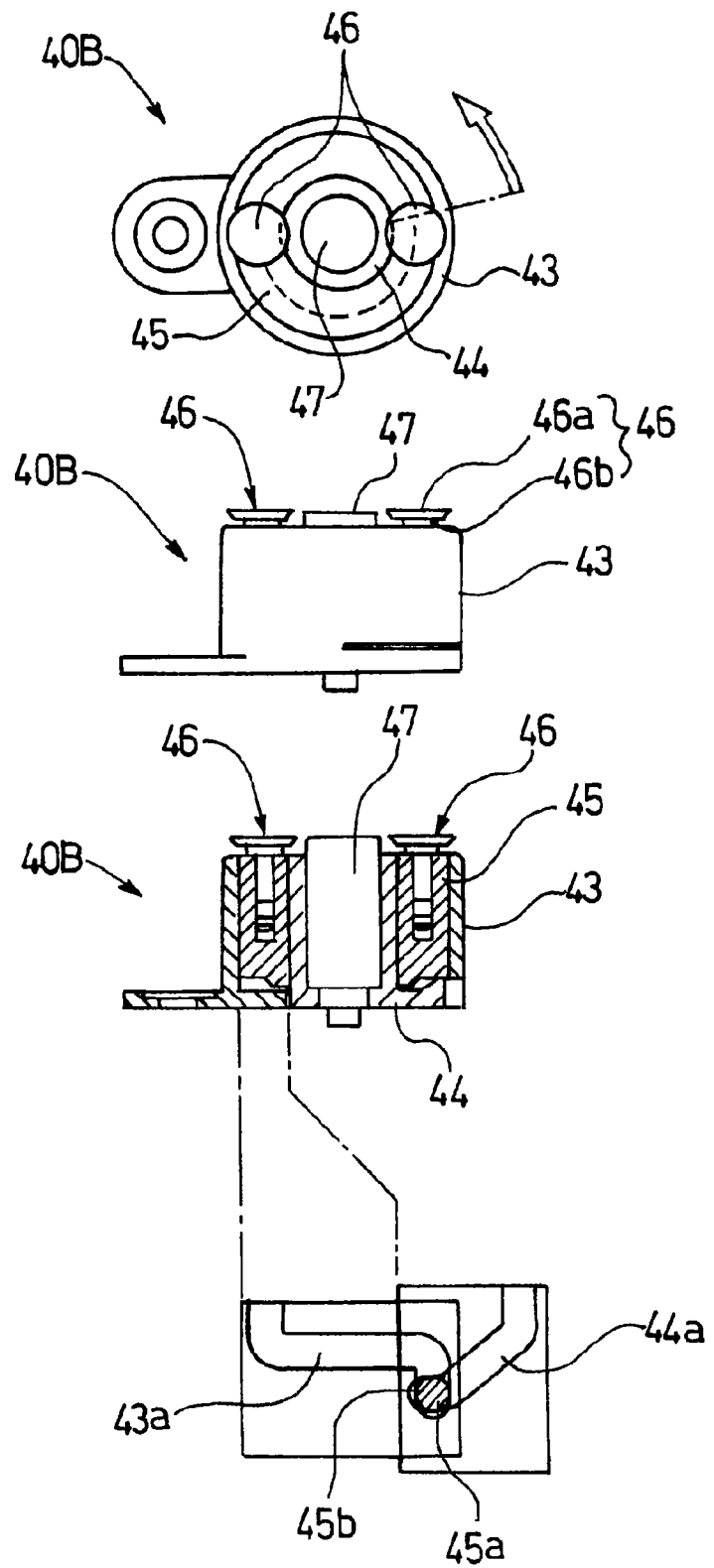
FIG. 5 includes a plan view, a side view, a cross-sectional view and a cam groove arrangement of a support member in the standby state according to the second embodiment of the invention.
Figure 7:
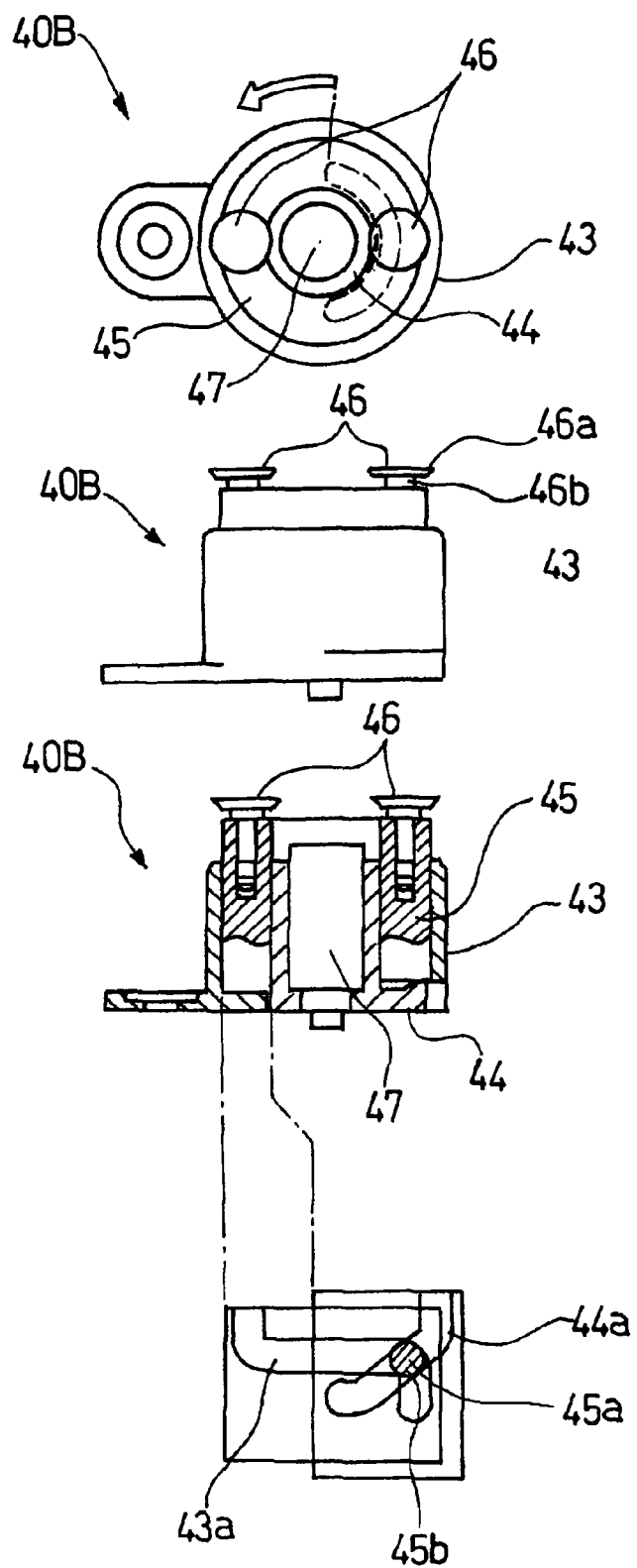
FIG. 7 includes a plan view, a side view, a cross-sectional view and a cam groove arrangement of a support member in the extended state according to the second embodiment of the invention.
Figure 9:
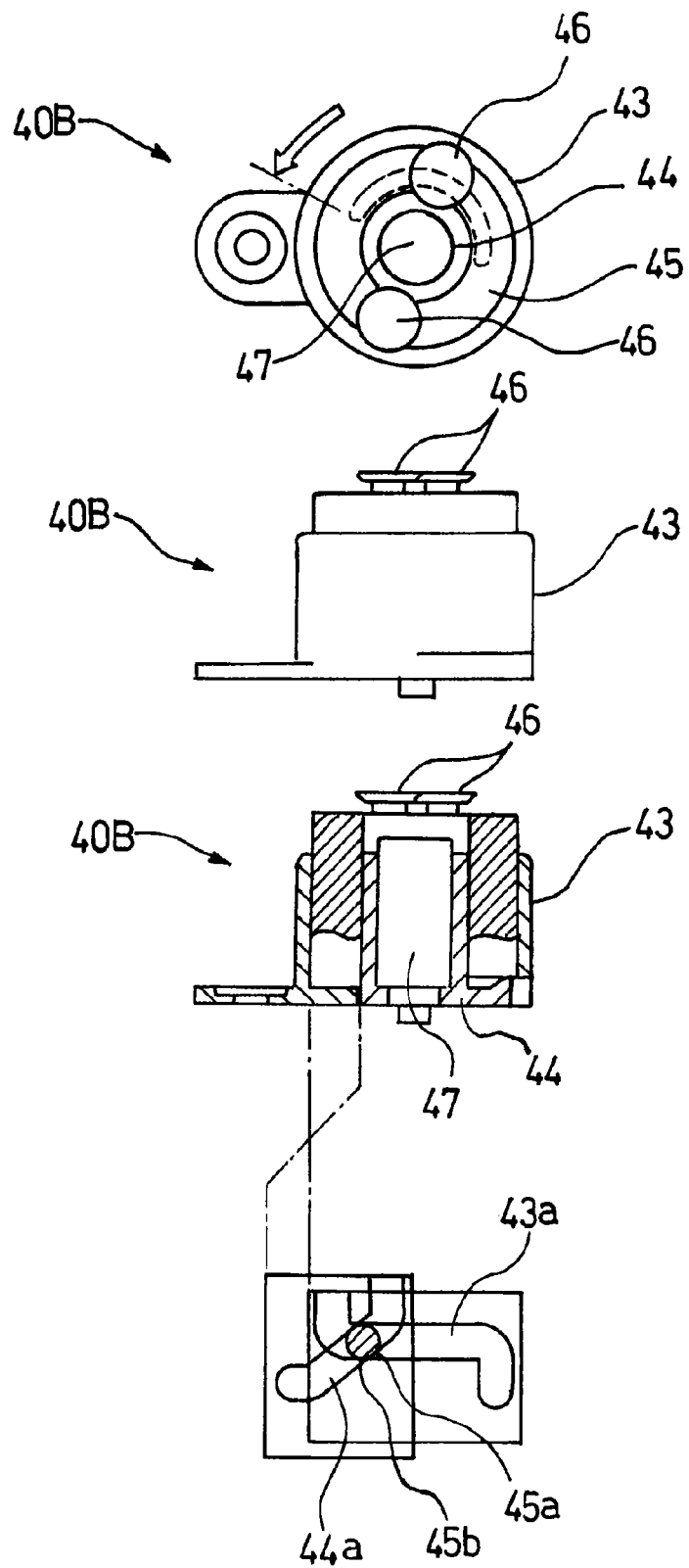
FIG. 9 includes a plan view, a side view, a cross-sectional view and a cam groove arrangement of a support member in the locked state according to the second embodiment of the invention.

The support member 40B according to the second embodiment includes a rotating body 44 rotated by a drive motor 47 at the center of a cylindrical housing 43, with a cylindrical support body 43 provided movably in vertical direction and rotatably in a gap between the inner peripheral surface of the housing 43 and the outer peripheral surface of the rotating body 44, as shown in FIGS. 5, 7 and 9.

A retaining part 46 including a head 46a and a neck 46b is provided on the top surface of the support body 45.

As shown in FIGS. 5, 7 and 9, a cam groove 44a is formed on the outer peripheral surface of the rotating body 44. A cam groove 43a is formed on the inner peripheral surface of the housing 43.

Cam projections 45a, 45b are formed on the inner peripheral surface and outer peripheral surface of the support body 45. The cam projection 45a provided on the inner peripheral surface of the support body 45 is movably fitted into the cam groove 44a provided on the rotating body 44. The cam projection 45b provided on the outer peripheral surface of the support body 45 is movably fitted into the cam groove 43a provided on the housing 43.

Figure 4:
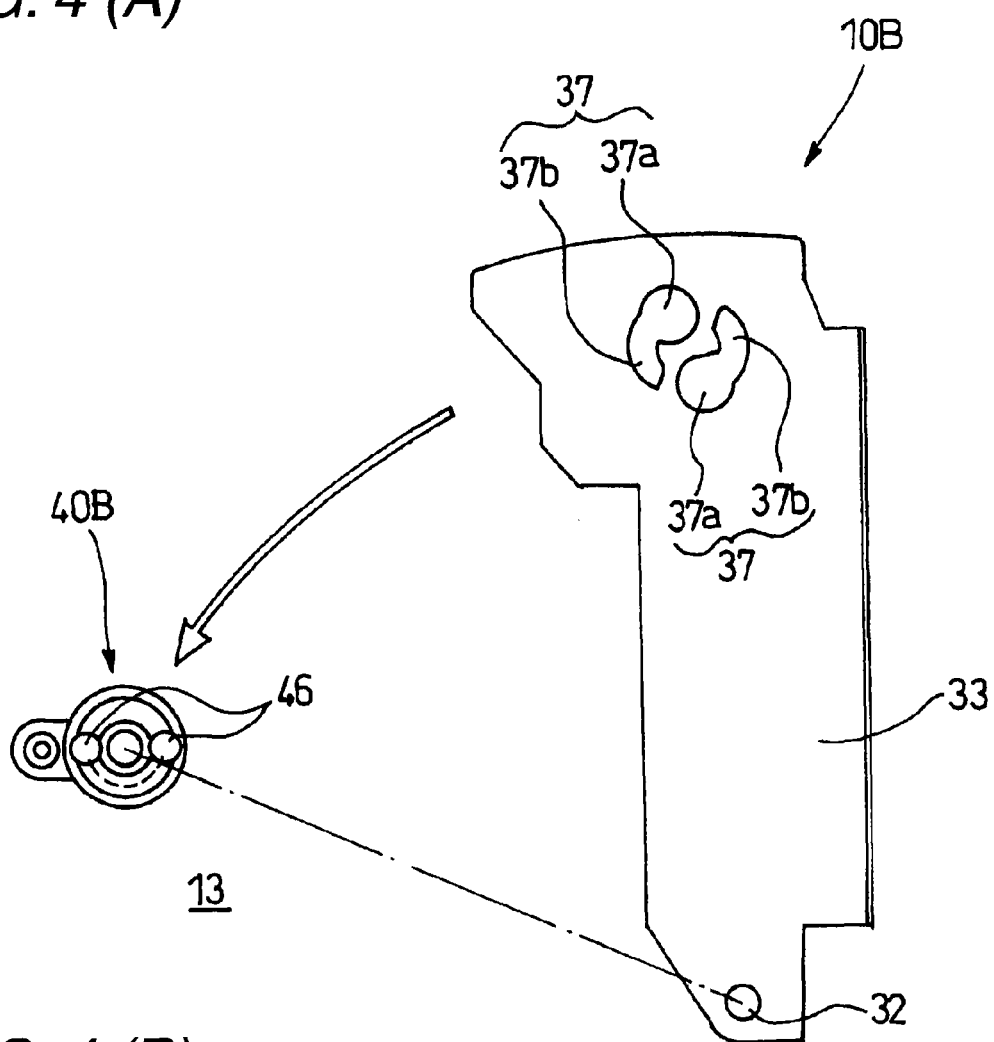
FIG. 4(A) is plan view of the standby state of a support member according to the second embodiment of the invention.
FIG. 4(B) is a cross-sectional view of the standby state of a support member according to the second embodiment of the invention.
Figure 4:
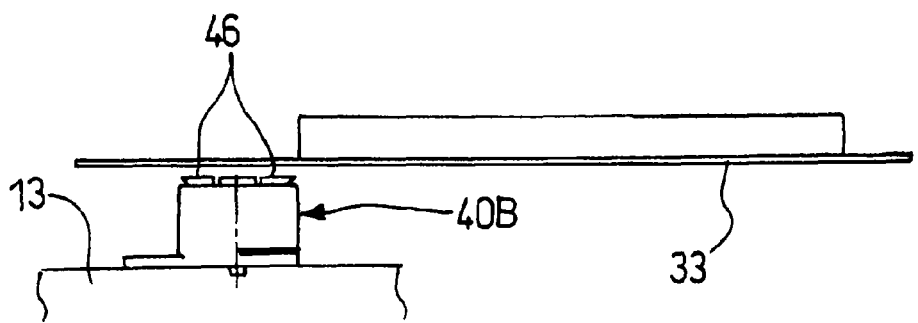
Figure 6:
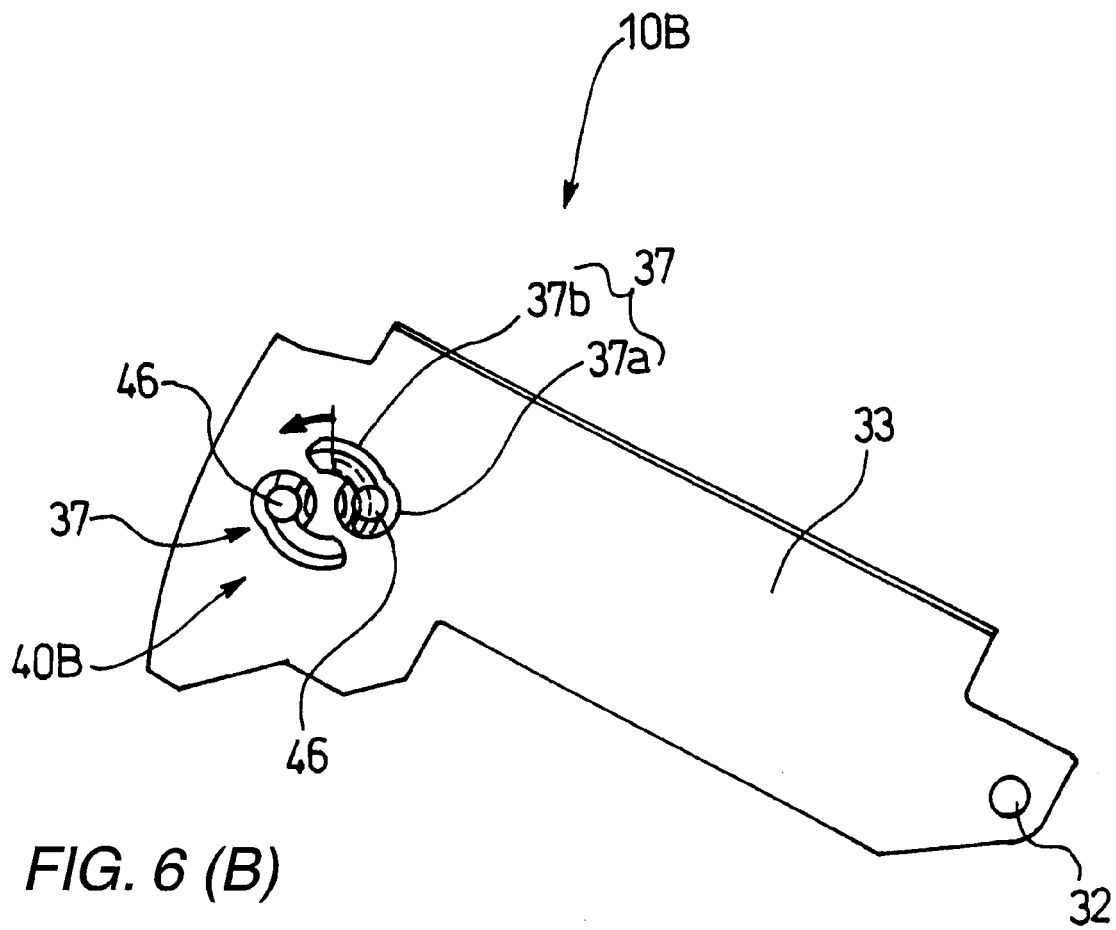
FIG. 6(A) is plan view of the standby state of a support member according to the second embodiment of the invention, and FIG. 6 (B) is a cross-sectional view of the standby state of a support member according to the second embodiment of the invention.
Figure 6:
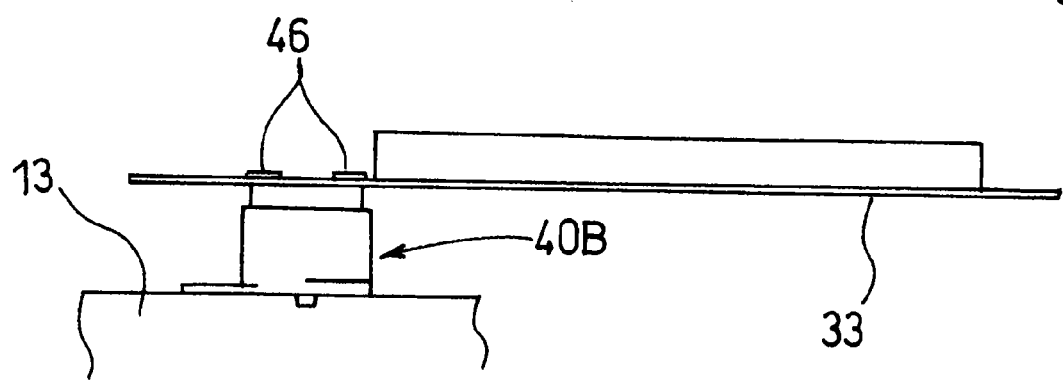
Figure 8:
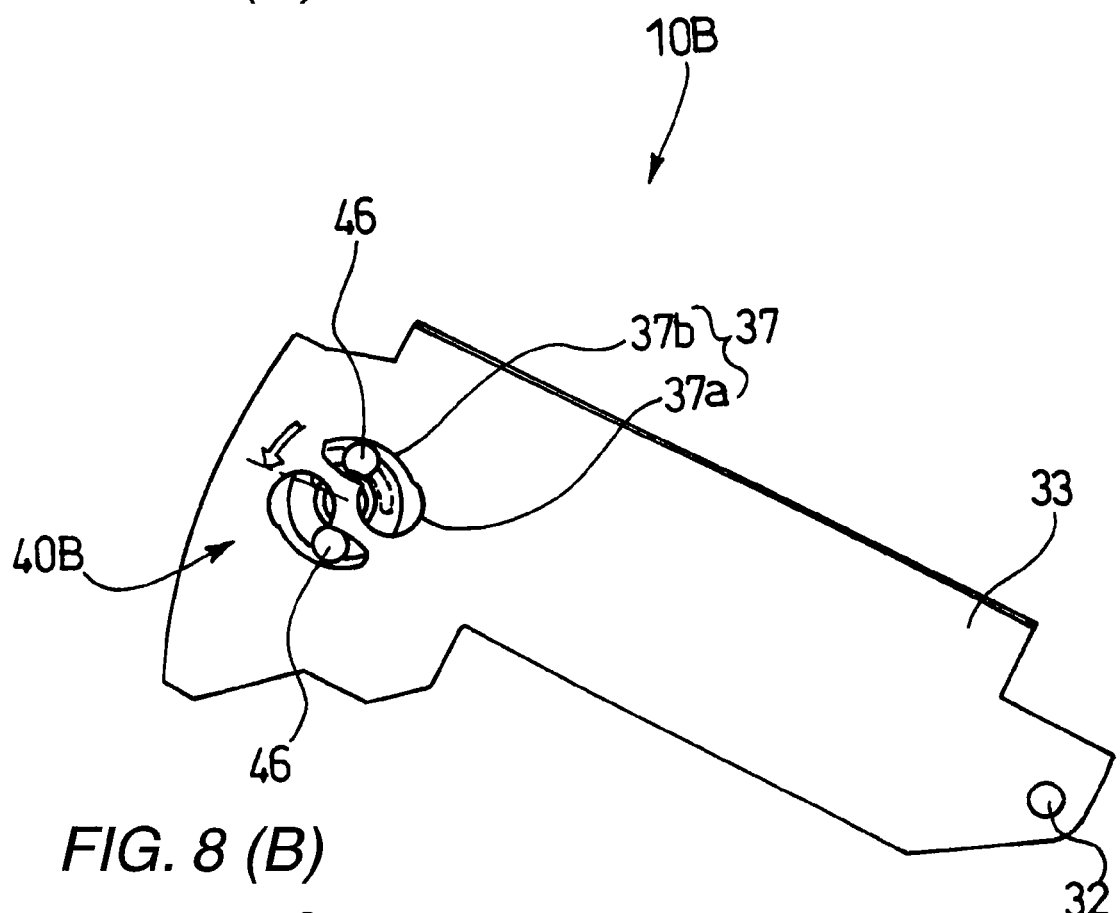
FIG. 8(A) is plan view of the standby state of a support member according to the second embodiment of the invention.
FIG. 8(B) is a cross-sectional view of the standby state of a support member according to the second embodiment of the invention.
Figure 8:
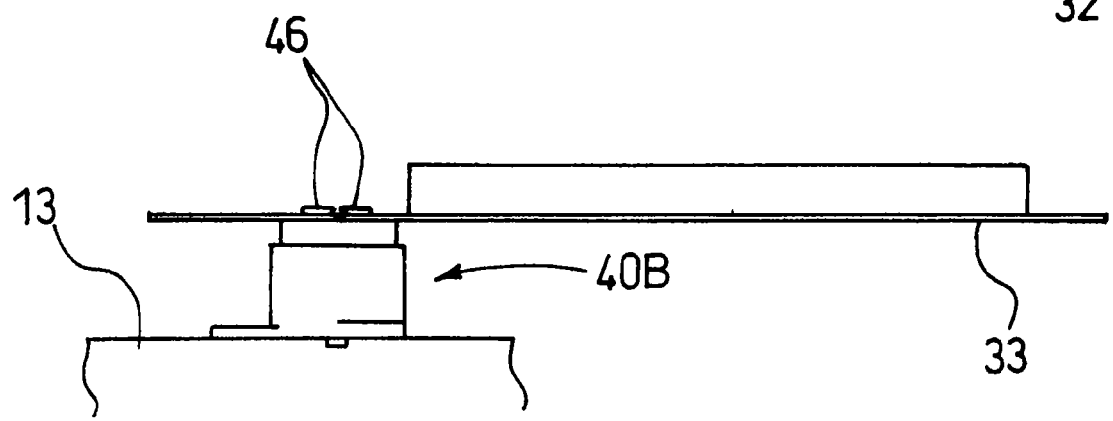

As shown in FIGS. 4, 6 and 8, a notch 37 is provided at the tip of the suspension chassis 33 of the rotating arm 30. The notch 37 retains the retaining part 46 provided on the support body 45 of the support member 40B.

The notch 37 is composed of an insertion part 37a where the head 46a of the retaining part 46 can be inserted and an arc-shaped retaining groove 37b having a width where the neck 46b can be inserted while the head 46a cannot be inserted. Thus, by inserting the head 46a of the retaining part 46 from the insertion part 37a, relatively rotating the retaining part 46 to move the head 46a into the retaining groove 37b, it is possible to fix the retaining part 46 to the suspension chassis 33.

Operation of thus configured optical disk device 10B will be described.

As shown in FIGS. 4 and 5, in the standby state where the rotating arm is in the standby position, the support body of the support member 40B is in the lowermost point so as not to interfere with the suspension chassis 33 of the rotating arm 30.

As shown in FIG. 6, when the rotating arm 30 is rotated and positioned in the recording/reproduction position, the rotating body 44 is rotated by the drive motor 47. As shown in FIG. 7, the cam projection 45a on the inner peripheral surface moves along the cam groove 44a on the outer peripheral surface of the rotating body 44 while the cam projection 45b on the outer peripheral surface of the support body 45 is inhibited to rotate by the vertical part of the cam groove 43a on the inner peripheral surface of the housing 43. This elevates the support body without rotating the same.

As a result, the head 46a of the retaining part 45 provided on the support body 44 is inserted into the insertion part 37a of the notch 37 provided on the suspension chassis 33.

As shown in FIGS. 8 and 9, further rotating the rotating body 44 causes the cam projection 45b on the outer peripheral surface of the support body 45 to rise and move to the level part of the cam groove 43a of the housing 43, and the support body 45 becomes rotatable and starts to rotate. This moves the neck 46b of the retaining part 46 along the retaining groove 37b, thereby retaining the retaining part 46 on the suspension chassis 33.

When the rotating arm 30 is rotated back to the standby position after recording/reproduction, the reversed procedure may be used to detach the retaining part 46 from the notch 37 to make the suspension chassis 33 movable.

In this way, according to the optical disk device 10B of the second embodiment of the invention, the suspension chassis 33 of the rotating arm 40 is supported on the main body 13 via the support member 40B. This suppresses the vibration of the rotating arm 30 to improve the vibration characteristic and ensure proper recording/reproduction.

While the optical disk devices 10A, 10B of the foregoing embodiments is built into the car audio device 1 including a radio 2, a cassette tape player 3 or the like, the invention is applicable to the optical disk devices 10A, 10B as standalone devices.

In case the turntable 31 is provided on the bottom surface of the suspension chassis 33, vibration of the rotating arm 30 can be suppressed by providing the support members 40A, 40B in such a fashion that the support members 40A, 40B will extend from the top to bottom of the main body 13.

This patent application is based on the Japanese Patent Application (No. 2004-218183) filed on Jul. 15, 2004 and the contents of which is incorporated herewith as reference.

INDUSTRIAL APPLICABILITY

As described above, the optical disk device according to the invention includes a support member for extending the axis line of an optical disk and supporting the tip of a rotating arm on a main body. The tip part of the rotating arm of a cantilever structure is supported to provide the rotating arm with a structure supported by both ends, thereby suppressing vibration of the rotating arm and improving the vibration characteristic. The optical disk device is effective as a multi-disk optical disk device that records or reproduces information onto/from a desired optical disk selected from the plurality of disks accommodated in a plurality of trays.

The invention claimed is:

1. An optical disk device, comprising:
    a rotating arm that includes a turntable which rotates an optical disk at a tip of the rotating arm and that movably supports an optical head part which records/reproduces information onto/from the optical disk and that is rotatable between a standby position and a playing position about a pivot substantially perpendicular to a disk surface of the optical disk; and
    a support member provided on a main body of the disk device that supports the rotating arm,
    wherein when the rotating arm is located in the playing position, the support member supports the rotating arm in a different position from the pivot;
    wherein a retaining portion is provided on an upper portion of the support member; and
    wherein the retaining portion is positioned and fixed to a notch which is provided at the rotating arm by relatively rotating the retaining portion with respect to the notch.

* * * * *

UNITED STATES PATENT AND TRADEMARK OFFICE
CERTIFICATE OF CORRECTION

PATENT NO. : 8,020,178 B2  Page 1 of 1
APPLICATION NO. : 11/571954
DATED : September 13, 2011
INVENTOR(S) : Kazunori Hasegawa et al.

It is certified that error appears in the above-identified patent and that said Letters Patent is hereby corrected as shown below:

Title Page

At Item (56) FOREIGN PATENT DOCUMENTS, please delete "EP  05  76  0185    5/2009".

At Item (56) OTHER PUBLICATIONS, please enter
-- Supplementary EP Search Report for EP  05  76  0185, dated May 4, 2009 --.

Signed and Sealed this
Twenty-first Day of February, 2012

David J. Kappos
*Director of the United States Patent and Trademark Office*